United States Patent [19]
Siems et al.

[11] Patent Number: 5,470,253
[45] Date of Patent: Nov. 28, 1995

[54] ENGINE WIRING SYSTEM

[75] Inventors: W. Peter Siems, West Lafayette; Dale A. Philyaw, Westpoint, both of Ind.

[73] Assignee: Caterpillar Inc., Peoria, Ill.

[21] Appl. No.: 316,972

[22] Filed: Oct. 3, 1994

[51] Int. Cl.⁶ ................................................ H01R 3/00
[52] U.S. Cl. ............................................ 439/491; 439/932
[58] Field of Search ........................... 439/34, 35, 130, 439/488, 491, 932, 495, 497, 498, 502, 503, 623

[56] References Cited

U.S. PATENT DOCUMENTS

| | | | |
|---|---|---|---|
| 1,281,288 | 10/1918 | Carley | 439/491 X |
| 2,546,854 | 3/1951 | Foster et al. | 174/153 |
| 2,592,788 | 4/1952 | Branson | 173/269 |
| 3,474,559 | 10/1969 | Hunt | 40/316 |
| 3,551,542 | 12/1970 | Perrone | 264/166 |
| 3,569,913 | 3/1971 | Wolff . | |
| 5,187,887 | 2/1993 | Mori et al. | 40/316 |
| 5,288,245 | 2/1994 | Piana et al. | 439/491 |

FOREIGN PATENT DOCUMENTS 2233165  1/1991  United Kingdom .

OTHER PUBLICATIONS

Article entitled "Tape Markers Speed Marking System" El. World p. 56.
IBM Technical Disclosure Bulletin, vol. 36, No. 08 dated Aug. 1993, p. 185.

*Primary Examiner*—Khiem Nguyen
*Attorney, Agent, or Firm*—Dennis C. Skarvan

[57] ABSTRACT

A wiring system for use with an engine or power module having a number of electrical systems includes a first electrical device of an electrical system, a second electrical device of the electrical system, and an electrical connector connected between the first and the second electrical devices to define an electrical circuit. The electrical connector includes alpha-numeric indicia identifying the electrical circuit. The alpha-numeric indicia include a first alpha-numeric indicium corresponding to the electrical system, a second alpha-numeric indicium corresponding to the first electrical device and a third alpha-numeric indicium corresponding to the second electrical device. The wiring system can also include a connection terminal disposed between the first and second electrical devices, wherein the electrical connector includes both first alpha-numeric indicia identifying the electrical circuit and second alpha-numeric identifying the connection terminal.

20 Claims, 4 Drawing Sheets

Fig. 4.

J | IGNITION SYSTEM (69, 70, 71, 68)

| | TYPE OF DEVICE | | 2ND DIGIT CYLINDER NUMBER (0-9) | | TO DISTINGUISH BETWEEN DEVICES WITH IDENTICAL CODES |
|---|---|---|---|---|---|
| 0 | CYLINDER 1-9 | X | 2ND DIGIT CYLINDER NUMBER (0-9) | 1 | COIL POSITIVE |
| 1 | CYLINDER 10-16 | | | 2 | COIL POSITIVE |
| 2 | MAGNETO | 0 | CASE GROUND | 0 | DEVICE NO. 1 |
| 3 | MAGNETO INTERFACE BOX | 1 | ALARM SIGNAL | 1 | DEVICE NO. 2 |
| 4 | ELECTRONIC IGNITION SYSTEM | 2 | SHUTDOWN SIGNAL | 2 | DEVICE NO. 3 |
| 5 | OVERSPEED SWITCH | 3 | ALARM INDICATOR | 3 | DEVICE NO. 4 |
| 6 | MAGNETIC SWITCH (MURPHY) | 4 | SHUTDOWN INDICATOR | 4 | DEVICE NO. 5 |
| 7 | | 5 | OVERSPEED SWITCH | 5 | DEVICE NO. 6 |
| 8 | | 6 | MAGNETIC SWITCH (MURPHY) | 6 | DEVICE NO. 7 |
| 9 | MISC | 7 | GROUND | 7 | DEVICE NO. 8 |
| A | | 8 | | 8 | DEVICE NO. 9 |
| Z | | 9 | MISC | 9 | MISC |

P | POWER (72)

| | SOURCE | | SOURCE 2 | | TO DISTINGUISH BETWEEN DEVICES WITH IDENTICAL CODES |
|---|---|---|---|---|---|
| 0 | ALTERNATOR | 0 | ELECTRONIC IGNITION CONTROL | 0 | DEVICE NO. 1 |
| 1 | BATTERY UNFUSED (+) | 1 | TIMING CONTROL | 1 | DEVICE NO. 2 |
| 2 | BATTERY FUSED (+) | 2 | STATUS CONTROL | 2 | STOP |
| 3 | BATTERY NEGATIVE (-) | 3 | ENGINE CONTROL #1 GOV | 3 | OFF/RESET |
| 4 | CONDITIONED POWER (+) | 4 | ENGINE CONTROL #2 | 4 | AUTO |
| 5 | CONDITIONED POWER (-) | 5 | ENGINE CONTROL #3 | 5 | MANUAL |
| 6 | SWITCHED POWER | 6 | DDTC/DISPLAY MODULE | 6 | DDTC/DISPLAY MODULE |
| 7 | BATTERY CHARGER | 7 | TERMINAL BOX | 7 | TERMINAL BOX |
| 8 | AMMETER | 8 | CONTROL PANEL | 8 | CONTROL PANEL |
| 9 | MISC | 9 | POWER DISTRIBUTION BOX | 9 | INDICATOR LAMP |
| A | | A | ACTUATOR | A | DEVICE 3-10 |
| Z | | B | STARTING MOTOR | Z | MISC |
| | | C | ALTERNATOR | | |
| | | D | AMMETER/VOLTMETER | | |
| | | E | CIRCUIT BREAKER | | |

D | DATA LINK (74)

| | SOURCE 1 | | DESTINATION | | TO DISTINGUISH BETWEEN DEVICES WITH IDENTICAL CODES |
|---|---|---|---|---|---|
| 0 | ELECTRONIC IGNITION CONTROL | 0 | ELECTRONIC IGNITION CONTROL | 0 | DEVICE NO. 1 |
| 1 | TIMING CONTROL | 1 | TIMING CONTROL | 1 | DEVICE NO. 2 |
| 2 | STATUS CONTROL | 2 | STATUS CONTROL | 2 | DEVICE NO. 3 |
| 3 | ENGINE CONTROL #1 GOV | 3 | ENGINE CONTROL #1 GOV | 3 | DEVICE NO. 4 |
| 4 | ENGINE CONTROL #2 | 4 | ENGINE CONTROL #2 | 4 | DEVICE NO. 5 |
| 5 | ENGINE CONTROL #3 | 5 | ENGINE CONTROL #3 | 5 | DEVICE NO. 6 |
| 6 | DDTC/DISPLAY MODULE | 6 | DDTC/DISPLAY MODULE | 6 | DEVICE NO. 7 |
| 7 | TERMINAL BOX | 7 | TERMINAL BOX | 7 | TERMINAL/SPLICE |
| 8 | CONTROL PANEL | 8 | CATERPILLAR DATA LINK | 8 | CATERPILLAR DATA LINK |
| 9 | MISC | 9 | RS 232 | 9 | RS 232 |
| A | | A | MISC | A | MISC |
| Z | | Z | | Z | |

M | MODULE (76)

| | 1ST MODULE | | 2ND MODULE | | TO DISTINGUISH BETWEEN DEVICES WITH IDENTICAL CODES |
|---|---|---|---|---|---|
| 0 | ELECTRONIC IGNITION CONTROL | 0 | ELECTRONIC IGNITION CONTROL | 0 | DEVICE NO. 1 |
| 1 | TIMING CONTROL | 1 | TIMING CONTROL | 1 | DEVICE NO. 2 |
| 2 | STATUS CONTROL | 2 | STATUS CONTROL | 2 | DEVICE NO. 3 |
| 3 | ENGINE CONTROL #1 GOV | 3 | ENGINE CONTROL #1 GOV | 3 | DEVICE NO. 4 |
| 4 | ENGINE CONTROL #2 | 4 | ENGINE CONTROL #2 | 4 | DEVICE NO. 5 |
| 5 | ENGINE CONTROL #3 | 5 | ENGINE CONTROL #3 | 5 | DEVICE NO. 6 |
| 6 | DDTC/DISPLAY MODULE | 6 | DDTC/DISPLAY MODULE | 6 | DEVICE NO. 7 |
| 7 | SPEED | 7 | UNUSED | 7 | DEVICE NO. 8 |
| 8 | UNUSED | 8 | TERMINAL STRIP | 8 | DEVICE NO. 9 |
| 9 | MISC | 9 | MISC | 9 | MISC |
| A | | A | | A | |
| Z | | Z | | Z | |

A | ACTUATOR (78, 79, 80, 81)

| | SOURCE OF CONTROL | | CONTROLLED PARAMETER | | TO DISTINGUISH BETWEEN DEVICES WITH IDENTICAL CODES |
|---|---|---|---|---|---|
| 0 | ELECTRONIC IGNITION CONTROL | 0 | UNUSED | 0 | DEVICE NO. 1 |
| 1 | TIMING CONTROL | 1 | AIR | 1 | DEVICE NO. 2 |
| 2 | STATUS CONTROL | 2 | FUEL | 2 | DEVICE NO. 3 |
| 3 | ENGINE CONTROL #1 GOV | 3 | GOVERNOR/SPEED | 3 | DEVICE NO. 4 |
| 4 | ENGINE CONTROL #2 | 4 | | 4 | DEVICE NO. 5 |
| 5 | ENGINE CONTROL #3 | 5 | | 5 | DEVICE NO. 6 |
| 6 | ACTUATOR | 6 | | 6 | DEVICE NO. 7 |
| 7 | UNUSED | 7 | | 7 | DEVICE NO. 8 |
| 8 | UNUSED | 8 | | 8 | DEVICE NO. 9 |
| 9 | MISC | 9 | MISC | 9 | MISC |
| A | | A | | A | |
| Z | | Z | | Z | |

Fig. 5.

EIS REMOTE CONTROL PANEL

| CIRCUIT IDENT | DESCRIPTION | TERMINATION | COLOR IDENT | TERMINATION |
|---|---|---|---|---|
| A220-T260 | GAS SHUTOFF VALVE | TERMINAL STRIP 260 | RD | ESCM - 23 |
| A220-T261 | GAS SHUTOFF VALVE | TERMINAL STRIP 261 | BK | ESCM - BATT ( - ) |
| A220-T262 | GAS SHUTOFF VALVE | TERMINAL STRIP 262 | CU | ESCM - BATT ( - ) |
| C251-T211 | EMERGENCY STOP PUSH BUTTON (EMTB) | TERMINAL STRIP 211 | BK | ESCM - 14 |
| C252-ECS1 | EMERGENCY STOP PUSH BUTTON (RCP) | ECS-1 | BK | ESPB - 3 |
| C253-ESPB4 | EMERGENCY STOP PUSH BUTTON (RCP) | ESPB-4 | BK | ESCM - 14 |
| C267-T158 | CUSTOMER REMOTE SHUTDOWN | TERMINAL STRIP 158 | BK | ESCM - 13 |
| C268-T201 | REMOTE START/STOP INITIATE CONTACT | TERMINAL STRIP 201 | BK | ESCM - 9 |
| C270-T159 | GOV SYNC MOTOR SWITCH | TERMINAL STRIP 159 | BK | ESCM - 22 |
| C290-T215 | DIAGNOSTIC RESET | TERMINAL STRIP 215 | BK | DIAGNOSTIC RESET 2 |
| C281-T154 | BATTERY ( - ) | TERMINAL STRIP 154 | BK | DIAGNOSTIC RESET 1 |
| C290-T216 | LAMP TEST SWITCH | TERMINAL STRIP 216 | BK | ESCM - 8 |
| C860-GOV-5 | | ESCM-17 | BK | SPEED CONTROL 5 |
| C861-GOV-2 | | ESCM-16 | RD | SPEED CONTROL 2 |
| C866-T178 | RUN RELAY (N.C.) | TERMINAL STRIP 178 | BK | ESCM - G |
| C866-T177 | RUN RELAY (N.C.) | TERMINAL STRIP 177 | WH | ESCM - 19 |
| C875-T174 | RUN RELAY (N.O.) | TERMINAL STRIP 174 | BK | ESCM - 20 |
| D078-T263 | DDT DATA LINK | TERMINAL STRIP 263 | RD | DDTC-D |
| D078-T264 | DDT DATA LINK | TERMINAL STRIP 264 | BK | DDTC-E |
| D078-T265 | DDT DATA LINK | TERMINAL STRIP 265 | CU | UNTERMINATED |
| D240-ESCM1 | | SHIELD BRAID TERMINATION | GN/YL | ESCM - 1 |
| D240-T162 | CUSTOMER INTERFACE MODULE, DATA | TERMINAL STRIP 162 | RD | ESCM - 6 |
| D240-T163 | CUSTOMER INTERFACE MODULE, SHIELD | TERMINAL STRIP 163 | CU | ESCM - 2 |
| D970-T251 | OIL PRESSURE/WATER TEMPERATURE | TERMINAL STRIP 251 | WH | ESCM - 5 |
| D970-T252 | OIL PRESSURE/WATER TEMPERATURE | TERMINAL STRIP 252 | RD | ESCM - 4 |
| D970-T253 | OIL PRESSURE/WATER TEMPERATURE | TERMINAL STRIP 253 | BK | ESCM - 3 |
| D970-T254 | OIL PRESSURE/WATER TEMPERATURE | TERMINAL STRIP 254 | CU | ESCM - 3 |
| J420-T256 | EIS SHUTDOWN RELAY | TERMINAL STRIP 256 | BK | ESCM - 15 |
| J430-T212 | WARNING LAMP | TERMINAL STRIP 212 | BK | WARNING INDICATOR ( - ) |
| J440-T213 | SHUTDOWN LAMP | TERMINAL STRIP 213 | BK | SHUTDOWN INDICATOR ( - ) |
| M200-T255 | ESCM SHUTDOWN | TERMINAL STRIP 255 | BK | ESCM - 24 |
| M281-T173 | ENFR | TERMINAL STRIP 173 | BK | ESCM - 18 |
| P220-T209 | STARTER MOTOR MAGNETIC SWITCH | TERMINAL STRIP 209 | RD | ESCM - 25 |
| P221-ESCM-T | | ESCM-BATT ( - ) | BK | ESCM - T |
| P290-T001 | BATTERY ( + ) | TERMINAL STRIP 001 | RD | ESCM - BATT+ |
| P288-ECS-6 | | ECS-6 | RD | ESCM - BATT+ |
| P320-ECS-1 | | ECS-1 | BK | ESCM - BATT- |
| P360-T153 | BATTERY ( - ) | TERMINAL STRIP 153 | BK | DDTC-B |
| P370-T005 | BATTERY ( - ) | TERMINAL STRIP 005 | BK | ESCM - BATT ( - ) |
| P380-T005 | BATTERY ( - ) | TERMINAL STRIP 005 | BK | TERMINAL STRIP 151 |
| P399-T152 | BATTERY ( - ) | TERMINAL STRIP 152 | BK | POWER INDICATOR ( - ) |
| P620-T103 | BATTERY ( + ) | TERMINAL STRIP 103 | RD | ESCM - F |
| P620-T104 | BATTERY ( + ) | TERMINAL STRIP 104 | RD | DDTC - A |
| P622-ECS-5 | | ECS-5 | BK | ESCM - 10 |
| P623-ECS-2 | | ECS-2 | BK | ESCM - 12 |
| P624-ECS-3 | | ECS-3 | BK | ESCM - 11 |
| P625-ECS-4 | | ECS-4 | BK | ESCM - 9 |
| P626-T208 | OFF/RESET INDICATOR | TERMINAL STRIP 208 | RD | ECS - 7 |
| P650-T160 | CUSTOMER INTERFACE MODULE, PWR+ | TERMINAL STRIP 160 | RD | T102-( BATT+ ) |
| P650-T161 | CUSTOMER INTERFACE MODULE, PWR- | TERMINAL STRIP 161 | BK | T156-( BATT- ) |
| P672-MT( + ) | | POWER INDICATOR + | RD | SHUTDOWN INDICATOR ( + ) |
| P673-MT( + ) | | SHUTDOWN INDICATOR + | RD | WARNING INDICATOR ( + ) |
| P677-T105 | BATTERY ( + ) | TERMINAL STRIP 105 | RD | POWER INDICATOR ( + ) |
| P680-T107 | BATTERY ( + ) | TERMINAL STRIP 107 | RD | ECS - 9 |
| P684-ECS-9 | | ECS-10 | RD | ECS - 9 |
| P685-ECS-10 | | ECS-8 | RD | ECS - 10 |
| P790-T101 | BATTERY CHARGER | TERMINAL STRIP 101 | RD | ESCM - 26 |
| S271-T205 | MAGNETIC PICKUP ESCM | TERMINAL STRIP 205 | RD | ESCM - 7 |
| S271-T206 | MAGNETIC PICKUP ESCM | TERMINAL STRIP 206 | BK | ESCM - 1 ( BATT- ) |
| S271-T207 | MAGNETIC PICKUP ESCM | TERMINAL STRIP 207 | CU | ESCM - 1 ( BATT- ) |

EIS CONTROL PANEL WOODWARD GOV HARNESS

| CIRCUIT IDENT | DESCRIPTION | TERMINATION | COLOR IDENT | TERMINATION |
|---|---|---|---|---|
| C876-T257 | 2301 REMOTE SPEED TRIM | TERMINAL STRIP 257 | RD | SPEED CONTROL 12 |
| C876-T258 | 2301 REMOTE SPEED TRIM | TERMINAL STRIP 258 | BK | SPEED CONTROL 11 |
| C876-T259 | 2301 REMOTE SPEED TRIM | TERMINAL STRIP 259 | GN/YL | SPEED CONTROL 1 |
| A330-T203 | GOV ACT/GOV SYNC MOTOR | TERMINAL STRIP 203 | RD | SPEED CONTROL 9 |
| A330-T204 | GOV ACT/GOV SYNC MOTOR | TERMINAL STRIP 204 | BK | SPEED CONTROL 10 |
| A330-T205 | GOV ACT/GOV SYNC MOTOR | TERMINAL STRIP 205 | CU | SPEED CONTROL 1 |
| P230-GOV-2 | SPEED CONTROL POWER | SPEED CONTROL 2 | RD | CB4-OUT |
| P330-T155 | BATTERY ( - ) | TERMINAL STRIP 155 | BK | SPEED CONTROL 1 |
| P688-T106 | BATTERY ( + ) | TERMINAL STRIP 106 | RD | CB4-IN |
| S270-T205 | MAGNETIC PICKUP 2301 GOV | TERMINAL STRIP 205 | RD | SPEED CONTROL 8 |
| S270-T206 | MAGNETIC PICKUP 2301 GOV | TERMINAL STRIP 206 | BK | SPEED CONTROL 7 |
| S270-T207 | MAGNETIC PICKUP 2301 GOV | TERMINAL STRIP 207 | CU | UNCONNECTED |

ENGINE WIRING SYSTEM

DESCRIPTION

1. Technical Field

The present invention relates generally to a wiring system for use with an engine and/or power module having a number of electrical systems, each electrical system including a number of electrical devices, and more particularly to a wiring system in which the electrical connectors connected between the electrical devices are marked with indicating or identifying indicia.

2. Background Art

Electrical connectors having indicating or identifying indicia are generally known in the art as evidenced by U.S. Pat. Nos. 2,592,788; 3,474,559; 3,551,542; 3,569,913; and 5,187,887, all of which deal with different wire marking apparatus.

Typically, the electrical connectors or wires are marked with indicia in order to identify the particular wire with reference to a circuit diagram. For example, it is known to provide alpha-numeric characters representing the particular electrical system with which the wire is associated.

It is also known to color code the electrical connectors to correspond with the proper connection in a connection junction or terminal plate to assist the user in making the electrical connection. See for example, U.S. Pat. No. 2,546,854 and GB 2,233,165. However, complex electrical circuits having a number of different electrical systems simply require too many electrical connectors for color coding to be effective. Instead, color coding is used only to convey the proper wire connections in simple electrical circuits or to identify broad circuit functions such as the wire being positive or negative. As a result, complex circuit diagrams are still relied on for the installation and repair of engines and/or power modules, such as diesel powered electrical generator sets. Prior art engines or power modules have typically marked the electrical connector or wire with an alpha-numeric designation in order to locate the particular wire in the circuit diagram. By following the path of the wire as diagrammatically represented in the circuit diagram, the various electrical connections can then be determined for the wire. However, as engine and power module electrical circuits become increasingly complex and the number of electrical connectors increases, the task of locating the particular electrical connector in the circuit diagram as well as the task of tracing the particular electrical connector between electrical devices becomes increasingly difficult and time-consuming, both in the initial wiring of the electrical system and in the diagnostics during servicing of the electrical system. What is needed is an engine or power module wiring system in which the electrical connections for the electrical connector can be readily determined without reference to a circuit diagram.

DISCLOSURE OF THE INVENTION

According to one embodiment of the present invention, a wiring system is disclosed for use with an engine or power module having a number of electrical systems, the wiring system comprising a first electrical device of an electrical system, a second electrical device of the electrical system, and an electrical connector connected between the first and the second electrical devices to define an electrical circuit, the electrical connector including first indicia identifying the electrical circuit, the first indicia including a first indicium corresponding to the electrical system, a second indicium corresponding to the first electrical device and a third indicium corresponding to the second electrical device.

According to another embodiment of the present invention, a wiring system for use with an engine or power module is disclosed having a number of electrical systems, the wiring system comprising a first electrical device of an electrical system, a second electrical device of the electrical system, a connection junction of the electrical system, the connection junction including a connection terminal corresponding to the first and the second electrical devices, and a first electrical connector connected between the first electrical device and the connection terminal and a second electrical connector connected between the connection terminal and the second electrical device to define an electrical circuit, the first electrical connector and the second electrical connector each including first indicia identifying the electrical circuit and second indicia identifying the connection terminal.

BRIEF DESCRIPTION OF THE DRAWINGS

FIG. 4 depicts various look-up tables for use with the electrical connectors of FIGS. 1 and 2.

FIG. 5 is a representative listing of alternate identifying indicia for the electrical connectors of FIGS. 2 and 3.

BEST MODE FOR CARRYING OUT THE INVENTION

Figure 1:
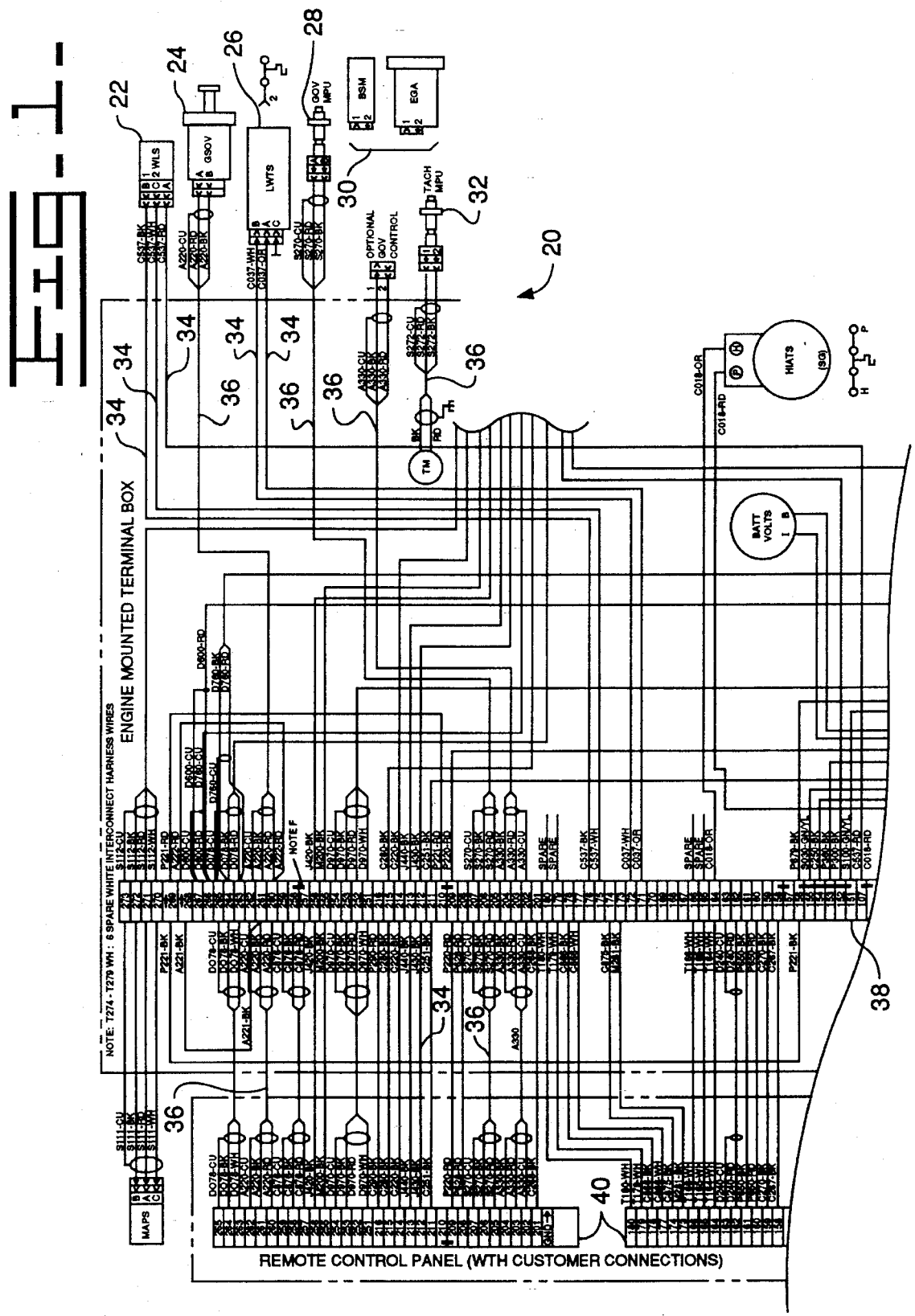
FIG. 1 is a portion of a wiring schematic of an engine or power module having a number of electrical systems, each electrical system further having a number of electrical devices, according to one embodiment of the present invention.

Referring now to FIG. 1, a portion of a wiring diagram 20 for an engine and/or power module is shown. The engine or power module of the preferred embodiment, although not shown, is an engine driven generator set. However, other engine or power modules having a complex wiring scheme will also benefit from the present invention. Wiring diagram 20 depicts generally the electrical connections between various electrical devices common to an engine driven generator set. For example, electrical device 22 is a water level switch, electrical device 24 is a gas shut off valve, electrical device 26 is a low water temperature switch, electrical device 28 is a governor magnetic pickup, electrical device 30 is a governor actuator/governor synchronous motor and electrical device 32 is a tachometer magnetic pickup. The particular function of electrical devices 22, 24, 26, 28, 30 and 32 is not critical, except in that they represent one of many such devices which together define an electrical system.

For example, devices 22 and 26 are switching devices of an electrical contactor or switching system. Similarly, devices 24 and 30 are actuating devices of an electrical actuating system, and devices 28 and 32 are sensing devices of an electrical sensing system. Other systems and their respective devices contemplated by the present invention include, but are not limited to; an ignition system having a spark plug, magneto, electronic ignition, and overspeed and magnetic switches; a power system having an alternator, battery, conditioned power, battery charger and ammeter; and a datalink system having an electronic ignition control, timing control, status control, engine control, DDTC (digital diagnostic tool connector)/display module, terminal box and a control panel.

In FIG. 1, like connectors 34 and like connectors 36 extend between and electrically connect the various electrical devices 22, 24, 26, 28, 30 and 32 to other electrical devices such as connection junction 38, in this embodiment a terminal strip, and connection junction 40, in this embodiment a remote control panel providing customer connection. The various connectors 34 differ only by wire specifications such as gauge, length, color, and marking indicia. The various connectors 36 similarly differ only by wire specifications such as gauge, length, color, and marking indicia, and further by the number of connectors per cable.

Figure 2:
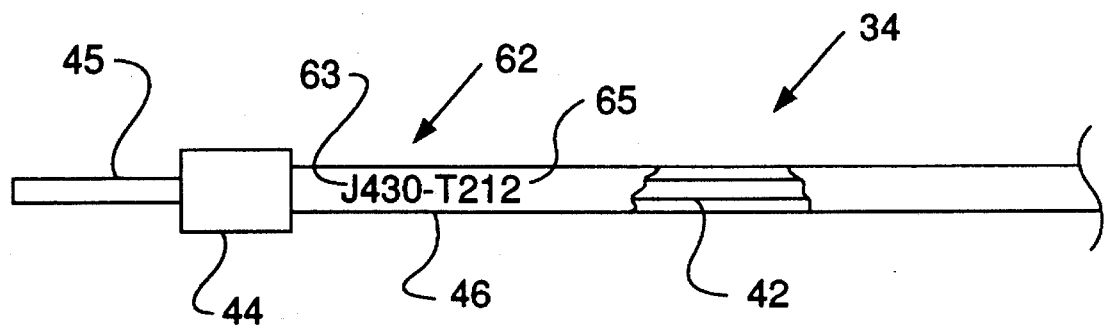
FIG. 2 is a partial cross-sectional view of an electrical connector for connecting between electrical devices of FIG. 1.
Figure 3:
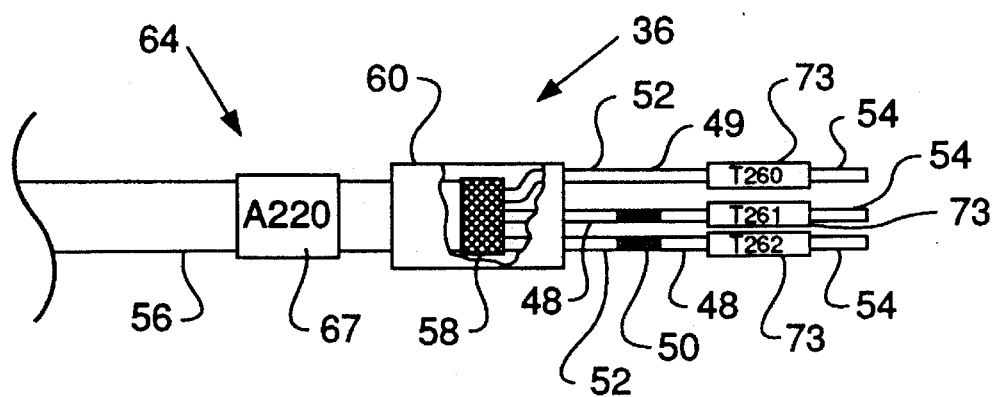
FIG. 3 is a partial cross-sectional view of an alternate electrical connector for connecting between electrical devices of FIG. 1.

Referring now to FIGS. 2 and 3, connectors 34 and 36 are shown in greater detail. Connector 34 utilizes a typical wire construction known in the art in that a stranded or solid single conductor wire core 42 is attached to electrical terminals 44 at each end and is insulated by a plastic jacket or shielding 46. In the specific preferred embodiment shown, connector 34 is constructed of 16 gauge stranded core wire.

In FIG. 3, connector 36 is a multi-conductor including two connector elements 48 and a shield drain wire 49 bundled within a shielded cable 56. In this case, the two connector elements 48 and a shield drain wire 49 include like wire cores 50 insulated by plastic jacket or shielding 52. Similar to connectors 34, terminals 54 are provided at the ends of connector elements 48 and shield drain wire 49. The further shielding 56 contains and protects the connector elements and shield drain wire and terminates at a copper shield 58. The terminal ends of shielding 56 and copper shield 58 are further enclosed by protective tubing 60.

Referring back also to FIG. 2, connectors 34 and 36 include an identification marker 62 and 64, respectively, for identifying their respective electrical circuits. For example, the identification marker 62 of connector 34 has two four character alpha-numeric indicia 63 and 65 printed thereon to identify the electrical devices and system of the electrical circuit containing connector 34, as well as the connection junction or terminal strip number of the connection junction interposed between the electrical devices. In this specific embodiment, identification marker 62 is integral with jacket 46, and the alpha-numeric indicia "J430-T212" is printed directly onto jacket 46 and repeated along the length of connector 34.

Conversely, identification marker 64 of connector 36 has a single four-character alpha-numeric indicia 67 printed thereon and repeated along the length of connector 36 to identify the electrical devices and system of the electrical circuit containing connector 36. Additional markers 73 identify the connection junction or terminal strip number of the connection junction interposed between the electrical devices; however, markers 73 are not repeated along the length of connector 36 but rather are only repeated at the terminal ends. In this specific embodiment, identification markers 64 and 73 are separate plastic markers heat shrunk onto jacket 56 and elements 48 and 49, respectively. The first alpha-numeric indicia "A220" is printed onto the heat-shrunk marker 64, and the second alpha-numeric indicia "T260", "T261" and "T262" are printed onto the heat-shrunk markers 73.

Unlike prior art identification indicia which correspond only generally to the electrical system that includes the particular connector and which require a separate wiring schematic, the present invention provides an electrical connector that includes an identification marker having indicia which set forth not only the electrical system containing the connector, but also the particular electrical devices connected by the electrical connector.

Referring to connector 34 in FIG. 2, the first alpha-numeric character "J" of first indicia 63 corresponds to the particular electrical system including connector 34. The second alpha-numeric character "4" of first indicia 63 corresponds to the electrical device connected at one end of connector 34. The third alpha-numeric character "3" of first indicia 63 corresponds to the electrical device connected at the other end of connector 34. The fourth alpha-numeric character "0" of first indicia 63 distinguishes between otherwise like-identified electrical devices. The fourth alpha-numeric character can correspond to a distinguishing numerical identification of the otherwise like-identified electrical devices or can correspond to a distinguishing function of the otherwise like-identified electrical devices. Additionally, the indicia "T212" identifies the connection junction or terminal strip number of the one or more connection junctions interposed between electrical devices.

Referring now to FIG. 4, the particular electrical system of connector 34 and the particular electrical devices connected at the ends of connector 34 are determined by reference to an alpha-numeric look-up table arranged in matrix form. Within look-up table 68 are three columns 69, 70, and 71 which correspond to the electrical device connected at one end of connector 34, the electrical device connected at the other end of connector 34, and distinguishing characteristics between otherwise like-identified electrical devices, respectively.

For the connector shown in FIG. 2 bearing the indicia "J430-T212", the first alpha-numeric character "J" of first indicia 63 corresponds to the ignition system as represented by look-up table 68. The second alpha-numeric character "4" corresponds to the electronic ignition as represented in column 69 of look-up table 68. The third alpha-numeric character "3" corresponds to an alarm indicator as represented in column 70 of look-up table 68. The fourth alpha-numeric character "0" corresponds to the particular alarm indicator among other like alarm indicators as represented in column 71 of look-up table 68. The specific alpha-numeric characters "T212" of second indicia 65 identify the electrical connection along terminal strip 38 to which connector 34 is electrically connected. As such, the electrical circuit for a connector 34 bearing the alpha-numeric indicia "J430-T212" is established even though the electrical devices are separated by terminal strips.

Similar look-up tables 72, 74, 76 and 78 are also shown in FIG. 4 and which represent other electrical systems corresponding to the first alpha-numerical character of first indicia 63. For example in look-up table 72, the alpha-numeric character "P" corresponds to the power system. In look-up table 74, the alpha-numeric character "D" corresponds to the data link system. In look-up table 76, the alpha-numeric character "M" corresponds to the module system. In look-up table 78, the alpha-numeric character "A" corresponds to the actuator system. Within each of the look-up tables 68, 72, 74, 76 and 78, the second alpha-numeric character represents a first electrical device (e.g., "source 1", "source", "1st module" and "source of control"), the third alpha-numeric character represents a second electrical device (e.g., "source 2", "destination", "2nd module" and "controlled parameter"), and the fourth alpha-numeric character distinguishes between connectors electrically connected between like electrical devices.

As another example, for the connector shown in FIG. 3 bearing the indicia "A220", the first alpha-numeric character "A" of indicia 67 corresponds to the electrical actuator system as represented by look-up table 78. The second alpha-numeric character "2" of indicia 67 corresponds to the status control device as represented in column 79 of look-up table 78. The third alpha-numeric character "2" of indicia 67 corresponds to the fuel shut-off device (i.e., gas shut off valve) as represented in column 80 of look-up table 78. The fourth alpha-numeric character "0" of indicia 67 corresponds to the particular fuel shut-off device (device no. 1) and distinguishes that device from a number of like fuel shut-off devices.

Additionally, the indicia "T260", "T261" and "T262" identify the connection junctions or terminal strip numbers of the one or more connection junctions interposed between electrical devices. In this specific embodiment, the specific alpha-numeric characters "T260", "T261" and "T262" of indicia 73 identify the electrical connections along terminal strips 38 and 40 to which connector 36 is electrically connected. As such, the electrical circuit for a connector 36 bearing the alpha-numeric indicia "A220-T262" is established even though the electrical devices are separated by terminal strips.

Referring now to FIG. 5, other alpha-numeric indicia for use with connectors 34 and 36 of circuit diagram 20 are shown. For example, table 78 lists the various connectors associated with the EIS remote control panel, (e.g. A220-T260, A220-T261. . . S271-T206, and S271-T207) while table 80 lists the various connectors associated with the EIS panel for a governor harness (e.g., C876-T257, C876-T258. . . S270-T206 and S270-T207). In each instance, the circuit connections for the connector are fully described by the first and second alpha-numeric indicia without resort to a separate and complex wiring diagram.

The benefits of the present engine wiring system are apparent when considering a wiring schematic having a thousand or more separate electrical connectors. The present system is easily adapted to even more complex systems simply by expanding the number of look-up tables or the number of electrical devices within the look-up tables. For example, ten electrical systems corresponding to ten look-up tables with each look-up table having ten electrical devices per column would fully describe 10,000 different electrical connectors.

Other benefits include time-saving diagnostics. For example, by repeating the identification marker continually along the length of the electrical connector, an open circuit is easily diagnosed and repaired. By merely locating the broken wire, the identification marker is readily located and the circuit known without reference to a wiring diagram. After locating a broken wire, the source, destination and function of the broken wire are easily determined merely by referring to the proper look-up table, rather than by searching through a lengthy and complex wiring schematic. As such, the broken wire immediately conveys the effect the break has on overall system operation and, based on the effect, the immediacy of the required repair.

The present invention can also be adapted for use with computer based diagnostics. For example, the connectors can be marked with computer readable indicia, for example optical bar codes. A bar code reading device can read the bar code directly into computer memory where it can be electronically compared with look-up tables that are also in computer memory. The electrical system and device connections for the connector can then be displayed for rapid installation and/or diagnostics. Further, additional information in computer memory associated with the electrical circuit can be displayed for diagnostics, such as the effect a broken wire has on system operation and the immediacy of the required repair; i.e., whether to immediately perform a costly system shut-down or wait to perform the repair during scheduled maintenance.

We claim:

1. A wiring system for use with an engine or power module having a number of electrical systems, the wiring system comprising:

a first electrical device of an electrical system;

a second electrical device of said electrical system; and an electrical connector connected between said first and said second electrical devices to define an electrical circuit, said electrical connector including first indicia identifying said electrical circuit;

said first indicia including a first indicium corresponding to said electrical system, a second indicium corresponding to said first electrical device and a third indicium corresponding to said second electrical device.

2. The wiring system of claim 1, wherein said first indicia are alpha-numeric indicia identifying said electrical circuit, said alpha-numeric indicia including a first alpha-numeric indicium corresponding to said electrical system, a second alpha-numeric indicium corresponding to said first electrical device and a third alpha-numeric indicium corresponding to said second electrical device.

3. The wiring system of claim 2, and further comprising:

a third electrical device of said electrical system, said third electrical device being substantially the same as said second electrical device;

wherein said first alpha-numeric indicia includes a fourth alpha-numeric indicium distinguishing said second electrical device from said third electrical device.

4. The wiring system of claim 2, wherein said first alpha-numeric indicia are repeated along the length of said electrical connector.

5. The wiring system of claim 2, wherein said electrical connector further comprises:

a wire core having a terminal at each end;

an insulative jacket extending between said terminals and surrounding said wire core; and an identification marker attached to said insulative jacket, said identification marker having said first alpha-numeric indicia printed thereon.

6. The wiring system of claim 5, wherein said identification marker is integral with said insulative jacket and said first alpha-numeric indicia is printed on said insulative jacket.

7. The wiring system of claim 5, wherein said identification marker is constructed of plastic and heat-shrunk onto said insulative jacket.

8. The wiring system of claim 2, wherein one of said electrical devices is a connection junction including a terminal and said electrical connector includes second alpha-numeric indicia identifying said terminal.

9. The wiring system of claim 8, wherein said second alpha-numeric indicia are disposed adjacent to said first alpha-numeric indicia.

10. The wiring system of claim 8, wherein said electrical connector further comprises:

a number of connector elements, each of said connector elements including a wire core having a terminal at each end and a first insulative jacket extending between said terminals and surrounding said wire core;

a second insulative jacket surrounding said number of connector elements and extending to near said terminals;

each of said connector elements further including a first identification marker attached to said first insulative jacket and exposed between said second insulative jacket and said terminal, said first identification marker having said second alpha-numeric indicia printed thereon; and a second identification marker attached to said second insulative jacket, said second identification marker having said first alpha-numeric indicia printed thereon.

11. A wiring system for use with an engine or power module having a number of electrical systems, the wiring system comprising:

a first electrical device of an electrical system;

a second electrical device of said electrical system;

a connection junction of said electrical system, said connection junction including a connection terminal corresponding to said first and said second electrical devices; and a first electrical connector connected between said first electrical device and said connection terminal and a second electrical connector connected between said connection terminal and said second electrical device to define an electrical circuit;

said first electrical connector and said second electrical connector each including first indicia identifying said electrical circuit and second indicia identifying said connection terminal.

12. The wiring system of claim 11, wherein said first indicia are alpha-numeric indicia including a first alpha-numeric indicium corresponding to said electrical system, a second alpha-numeric indicium corresponding to said first electrical device and a third alpha-numeric indicium corresponding to said second electrical device.

13. The wiring system of claim 12, and further comprising:

a third electrical device of said electrical system, said third electrical device being substantially the same as said second electrical device;

wherein said first alpha-numeric indicia includes a fourth alpha-numeric indicium distinguishing said second electrical device from said third electrical device.

14. The wiring system of claim 11, wherein said connection terminal includes alpha-numeric indicia identifying said connection terminal and said second alpha-numeric indicia corresponds to said alpha-numeric indicia identifying said connection terminal.

15. The wiring system of claim 14, wherein said second alpha-numeric indicia are disposed adjacent to said first alpha-numeric indicia.

16. The wiring system of claim 15, wherein said first and said second alpha-numeric indicia are repeated along the lengths of each of said first and said second electrical connectors.

17. The wiring system of claim 11, wherein each of said first and said second electrical connectors further comprises:

a wire core having a terminal at each end;

an insulative jacket extending between said terminals and surrounding said wire core; and an identification marker attached to said insulative jacket, said identification marker having said first and said second alpha-numeric indicia printed thereon.

18. The wiring system of claim 17, wherein said identification marker is integral with said insulative jacket and said first alpha-numeric indicia is printed on said insulative jacket.

19. The wiring system of claim 17, wherein said identification marker is constructed of plastic and heat-shrunk onto said insulative jacket.

20. The wiring system of claim 11, wherein said electrical connector further comprises:

a number of connector elements, each of said connector elements including a wire core having a terminal at each end and a first insulative jacket extending between said terminals and surrounding said wire core;

a second insulative jacket surrounding said number of connector elements and extending to near said terminals;

each of said connector elements further including a first identification marker attached to said first insulative jacket and exposed between said second insulative jacket and said terminal, said first identification marker having said second alpha-numeric indicia printed thereon; and a second identification marker attached to said second insulative jacket, said second identification marker having said first alpha-numeric indicia printed thereon.

* * * * *